A. F. HALDEMAN.
TRACK OR ROADWAY FOR THE USE OF MOTOR PROPELLED VEHICLES.
APPLICATION FILED JULY 13, 1911.
1,070,248. Patented Aug. 12, 1913.
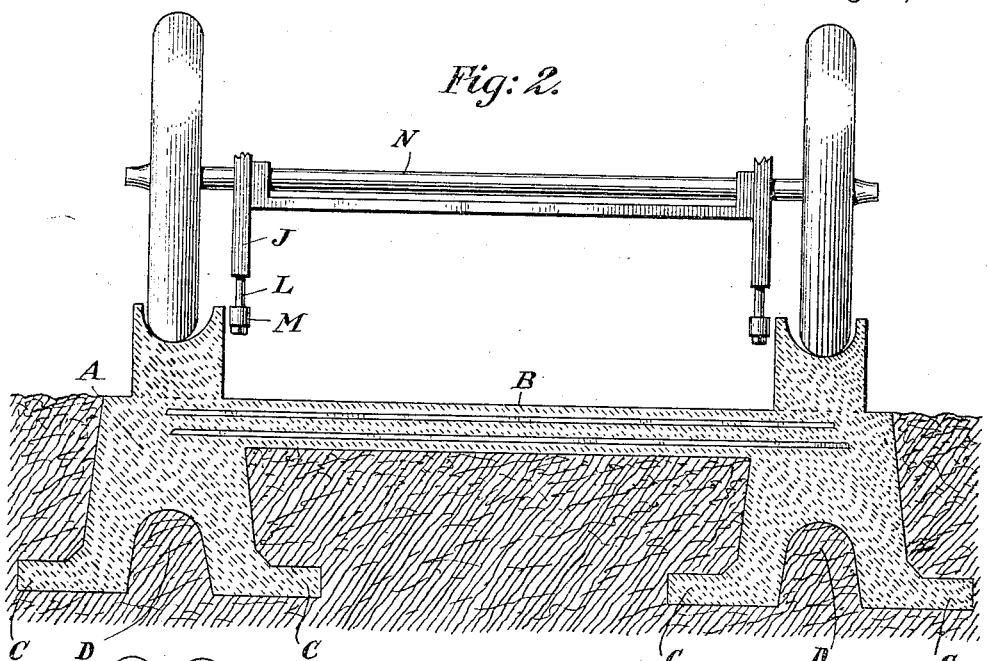
Fig: 2.
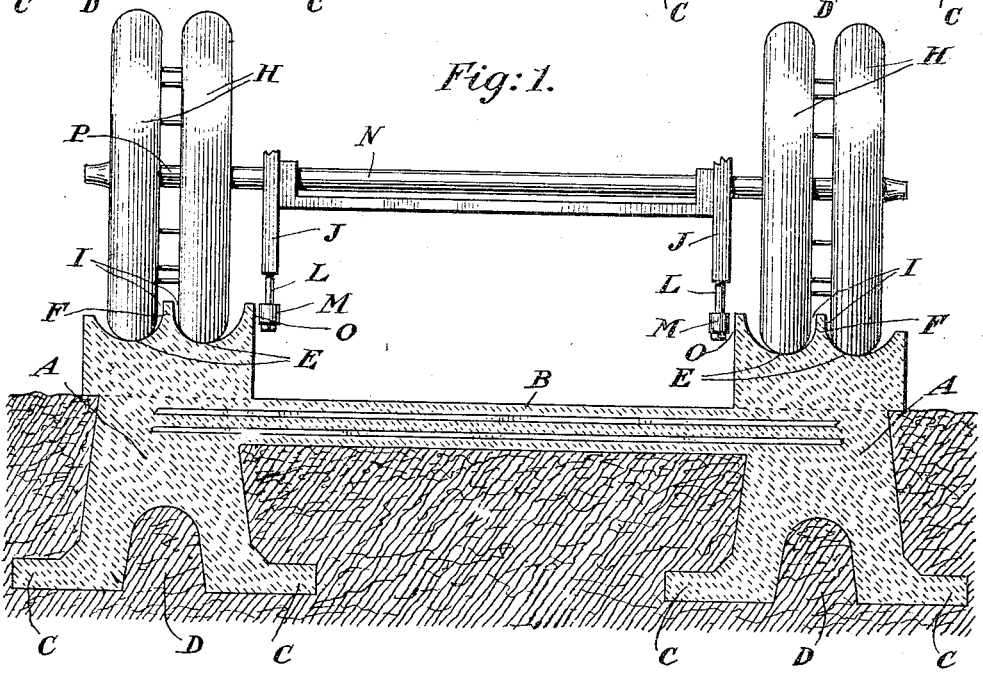
Fig: 1.
Witnesses: Inventor:
Samuel C. Richie Allen F. Haldeman
Earl C. Mikesell

UNITED STATES PATENT OFFICE.

ALLEN F. HALDEMAN, OF NEW PARIS, OHIO.

TRACK OR ROADWAY FOR THE USE OF MOTOR-PROPELLED VEHICLES.

1,070,248.  Specification of Letters Patent.  Patented Aug. 12, 1913.

Application filed July 18, 1911. Serial No. 639,201.

*To all whom it may concern:*

Be it known that I, ALLEN F. HALDEMAN, of New Paris, Preble county, Ohio, have invented a new and useful Improvement in Tracks or Roadways for the Use of Motor-Propelled Vehicles; and I declare the following to be an exact description thereof, reference being had to the accompanying drawings, and to the letters of reference marked thereon, which form part of this specification.

My invention relates to improvements in the form and construction of tracks or ways along public roads or elsewhere, in a permanent and comparatively inexpensive manner, of concrete, over which automobiles and specially constructed cars may be operated either for pleasure or for carrying passengers and freight.

Among the objects of this improvement in such roadway or track is, first,—to make possible and practicable its permanent and economical construction of the most durable material for the purpose for which it is designed. Second,—a track designed for specially constructed motor propelled vehicles with rubber or other elastic tires for regular service in the transportation of freight, passengers, mails, &c., as well as for private motor propelled, elastic tired vehicles, such as are now in common use, which track may be constructed either along public highways or elsewhere, on private right of way, without reference to the contour of the ground, connecting points most directly, thus furnishing rapid transit to towns, villages, and neighborhoods for a minimum outlay of capital.

I attain these objects by the form and manner of construction illustrated in the accompanying drawing in which—

Figure 1 represents a cross-section of the track, constructed for vehicles using wheels either singly, as ordinary automobiles, or in pairs as heavy trucks, or specially constructed cars. Fig. 2 is a vertical section of the track, designed for vehicles using wheels singly, as automobiles, and shows the adjustment of wheels thereon to the grooves therein.

Throughout the accompanying drawing, similar reference letters refer to similar parts.

In Fig. 1 the base or footing C. C., the wall A, the grooves E. and the flanges, O. I. and F. constitute the track when constructed for the use of vehicles with either single or double wheels, and consists of two continuous walls of concrete laid in trenches of sufficient width to secure a firm foundation or footing, C. and depending on the character of the soil and climate, of sufficient depth to insure against displacement by frost, and carried to the surface of the ground or so much above it as the surface conditions may make necessary. Into the top surface of each continuous wall, is molded a semi-circular concave groove, E, to receive and retain the wheels of vehicles using wheels singly, as automobiles, or when such track is designed for the use of vehicles with double wheels, H on axle, P, then double circular concave grooves. E are molded into the top surface of the wall, A. The flanges O. I. and F. are carried slightly higher than the outside flanges of the grooves when designed for the use of vehicles with double wheels, H, all of which are constructed and molded in place and are continuous. When the character of the soil renders it essential, the two walls are bound together by a reinforced concrete paving, B, but this will be seldom if ever necessary.

The reference characters J. L. M. and N. designate elements of a derailment guard not claimed in this application; hence is not further described.

When it may be desirable to economize in the use of material for construction, the ridge of earth, D is left standing when the trench is opened to receive the concrete, A.

Roadways of this kind with single track and turnouts for passing or with continuous double track, as the traffic thereon may require, can be economically constructed over almost any character of surface, requiring right of way of very limited width and of correspondingly limited cost and thus supply rapid transit when needed and much desired but which would otherwise be impracticable.

I am aware that prior to my invention concrete tracks and roadways have been to some extent in use. I do not, therefore, claim such a construction broadly, but What I do claim as my invention and desire to secure by Letters Patent is—

An automobile track consisting of two parallel and continuous concrete walls constructed in parallel trenches of any desired width and depth to secure stability, having molded into the top surface of each a double concave groove in which may roll the double wheels of a truck or specially constructed, motor propelled car, using elastic tire.

ALLEN F. HALDEMAN.

Witnesses:
PERRY J. FREEMAN,
WILLIAM A. BOND.